(12) United States Patent
Miller et al.

(10) Patent No.: US 8,683,583 B2
(45) Date of Patent: Mar. 25, 2014

(54) USING VIRTUAL TABLE PROTECTIONS TO PREVENT THE EXPLOITATION OF OBJECT CORRUPTION VULNERABILITIES

(75) Inventors: Matthew R. Miller, Seattle, WA (US); Kenneth D. Johnson, Bellevue, WA (US); Timothy William Burrell, Prestbury (GB)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 12/958,668

(22) Filed: Dec. 2, 2010

(65) Prior Publication Data

US 2012/0144480 A1    Jun. 7, 2012

(51) Int. Cl.
*G06F 21/00*    (2013.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | | |
|---|---|---|---|
| 5,327,562 A | 7/1994 | Adcock | |
| 5,761,670 A * | 6/1998 | Joy ........................................ | 1/1 |
| 5,794,041 A | 8/1998 | Law et al. | |
| 6,546,443 B1 * | 4/2003 | Kakivaya et al. ............. | 710/200 |
| 2007/0006170 A1 * | 1/2007 | Hasse et al. .................... | 717/131 |
| 2008/0098205 A1 * | 4/2008 | Dolve et al. .................... | 712/220 |
| 2008/0126736 A1 | 5/2008 | Heil | |
| 2009/0254726 A1 | 10/2009 | Miller et al. | |
| 2009/0327711 A1 * | 12/2009 | Goldsmid et al. ............. | 713/165 |

OTHER PUBLICATIONS

Roberts, Mark, "Visual C++ Precompiled Header Errors on Windows 7", Retrieved at <<http://blogs.msdn.com/b/vcblog/archive/2009/11/12/visual-c-precompiled-header-errors-on-windows-7.aspx>>, Nov. 12, 2009, pp. 1.
Novark, et al, "DieHarder: Securing the Heap", Retrieved at <<http://www.cs.umass.edu/~emery/pubs/ccs03-novark.pdf>>, CCS '10, Oct. 4-8, 2010, Chicago, Illinois, USA, pp. 12.
"Apple WebKit HTML Element Use After Free Vulnerability", Retrieved at <<http://www.securiteann.com/unixfocus/5BP36200UE.html>>, Mar. 17, 2010, pp. 2.
"novtable", Retrieved at <<http://msdn.microsoft.com/en-us/library/k13k85ky(VS.71).aspx>>, 2007, pp. 2.
Akritidis, Periklis, "Cling: A Memory Allocator to Mitigate Dangling Pointers", Retrieved at <<www.cl.cam.ac.uk/~pa280/dangling.pdf>>, 2010, pp. 16.
Abadi, et al, "Control-Flow Integrity", Retrieved at <<http://www.cs.princeton.edu/~jligatti/papers/cficcs.pdf>>, CCS '05, Nov. 7-11, 2005, Alexandria, Virginia, USA, pp. 14.

* cited by examiner

*Primary Examiner* — Michael S McNally
(74) *Attorney, Agent, or Firm* — Dan Choi; Carole Boelitz; Micky Minhas

(57) ABSTRACT

The subject disclosure is directed towards preventing the exploitation by malicious code of object state corruption vulnerabilities, such as use-after-free vulnerabilities. An object class is configured with a secret cookie in a virtual function table of the object, e.g., inserted at compile time. An instrumentation check inserted in the program code evaluates the secret cookie to determine whether the object state has been corrupted before object access (e.g., a call to one of the object's methods) is allowed. If corrupted, access to the object is prevented by the instrumentation check. Another instrumentation check may be used to determine whether the object's virtual table pointer points to a location outside of the module that contains the legitimate virtual function table; if so, object access is prevented.

20 Claims, 5 Drawing Sheets

USING VIRTUAL TABLE PROTECTIONS TO PREVENT THE EXPLOITATION OF OBJECT CORRUPTION VULNERABILITIES

BACKGROUND

Programs written in languages that lack sound object lifetime management facilities are susceptible to a specific class of memory safety issue known as a "use-after-free" vulnerability. A use-after-free vulnerability occurs when a program prematurely frees an object and then later accesses the object (either through a field or through a method call). Between the freeing and accessing of the object, a malicious program can corrupt the object, e.g., by replacing it with its own object or part of an object. Vulnerabilities also can result from other types of object corruption.

Object corruption can result in undefined behavior, including allowing arbitrary code to be executed and take control of the machine running the program. For example, an object contains a pointer to its virtual function table of methods that a program may call. However, if that object gets corrupted, such as by being prematurely freed and having some or all of its memory space overwritten, the pointer to the virtual function table may be changed. The next access of that object may result in getting a pointer to a malicious program's space (a fake virtual function table) instead of to the legitimate virtual function table. Once this occurs, the malicious program has control of the instruction pointer.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which the integrity of an object is verified before its methods and/or member fields are accessed, so as to prevent object access if the object is corrupted. In one aspect, a program that accesses the object is configured with one or more instrumentation checks that determine whether the object state is corrupted before allowing access. Access is allowed only when each instrumentation check that checks for object state corruption is satisfied.

In one implementation, a class corresponding to an object is configured with a secret cookie in a virtual function table of the object, e.g., inserted at compile time. When a program attempts to access the object, such as to call a method, an instrumentation check inserted in the program code before the access attempt, which evaluates the current value of the secret cookie in the object's virtual function table against a valid/expected value for the secret cookie that is known to the instrumentation check. If they do not match, access is prevented, such as by terminating the process or thread corresponding to the call.

Another instrumentation check is directed towards determining whether the virtual table pointer points to a location outside of the module that contains the legitimate virtual function table. If so, the object is corrupted and may point to a fake virtual function table created by malicious code, whereby this instrumentation check prevents the subsequent code from calling the object's method or accessing a member field.

In one implementation, the valid value of the secret cookie may be an address of a function, which is automatically updated if the object's corresponding module is relocated. In an alternative implementation, the valid value of the secret cookie corresponds to a random value provided to the virtual table and the instrumentation check by the operating system when the corresponding module is loaded.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards preventing attackers from exploiting object corruption vulnerabilities, especially use-after-free and other dangling pointer vulnerabilities, by introducing additional runtime security checks into the code. In general, this is accomplished by verifying the integrity of the object, e.g., the virtual function table (virtual function table) or member fields associated with a C++ object, at appropriate points in program execution. In one implementation, the integrity is verified by adding any suitable secret data (a "secret cookie") to the virtual function table or member fields associated with a C++ class at compile time. Then, when accessed during runtime, the existence of the correct secret cookie is verified by instrumentation code that is inserted at each virtual method call site or member field. Only in the event that the integrity is verified can the object's method be called or the member field be accessed.

It should be understood that any of the examples herein are non-limiting. For one, some of the examples are generally directed towards verifying the integrity of an object's virtual function table before allowing a virtual function table call, however access to any member field may be similarly protected. For another, the examples are directed towards C++, however other programming languages may benefit from the technology described herein. Still further, some of the specification refers to use-after-free vulnerability, however any type of corruption that allows similar changes to an object may be detected by the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and computer security in general.

Figure 1:
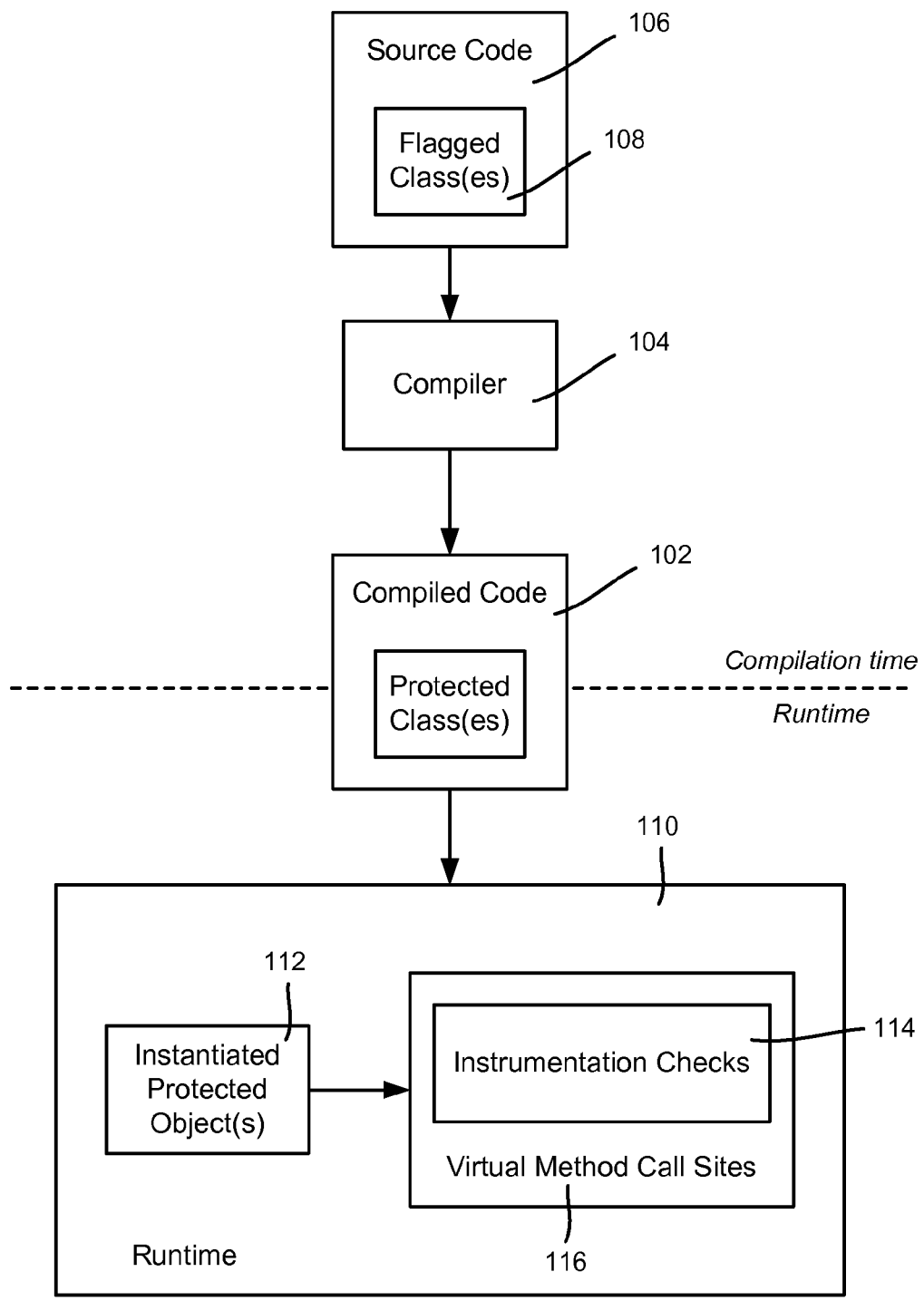
FIG. 1 is a block diagram representing example components for preventing the exploitation of object corruption vulnerabilities, including examples of compile-time components and runtime components.

FIG. 1 shows example components for implementing protection against security vulnerabilities in a compiled program 102, including by adding capabilities to a C++ (or similar language) compiler 104. Note that the compiler 104 may be any mechanism that constructs the virtual table, including, for example, a JIT (just-in-time) compiler; FIG. 1 shows a compiler that compiles source code 106, such as in an offline compilation operation that is separate from the runtime execution of the compiled code 102.

A specific flag inserted (by the programmer or an algorithm) into the source code 106 is association with an object class to be protected is recognized and processed by the compiler. Associating the flag with the class makes it possible to enable use-after-free or other corruption protections on a per-class basis (such as for classes which may be prone to use-after-free issues), shown in FIG. 1 as flagged classes 108. Note that in an alternative implementation, such a flag need not be used, e.g., the compiler may be configured to implement object protection for all classes without requiring the flag, possibly in accordance an on or off parameter selected (e.g., by a user or algorithm) at the time of compilation of a module. Note that not all classes may need to be protected, however, as this may be inefficient. Further, as will be understood, a class can only be protected as described herein if it is permissible for its virtual function table layout to change; for example, with established COM interfaces, it is not safe to change the definition of the associated virtual function table layout, as doing so may break compatibility with other applications. Note however that instead of placing a vtable cookie at a positive offset from the start of the virtual function table, a vtable cookie may be placed at a negative offset (e.g., locating the vtable cookie before the 'first' vtable entry). This may extend which classes are able to have vtguard protection to include those that cannot have new vtable entries added at the end.

In the code 106 to be compiled, the associated flagged classes 108 that have this flag are detected by the compiler 104. The flag instructs the compiler 104 to add a secret cookie to the virtual function table associated with the class, and also to associate the secret cookie with instrumentation (security) checks located at each virtual method call site for the class; (that is, wherever code calls a method of the protected object through its vtable). Instrumentation checks also may be associated with any member field access to ensure that the object state with respect to that member field is intact. For example, a member field may contain a pointer, with the pointer accessed via that field and used in a function call; if the pointer in that field is replaced via object corruption, a call to an illegitimate program location may result.

Figure 2:
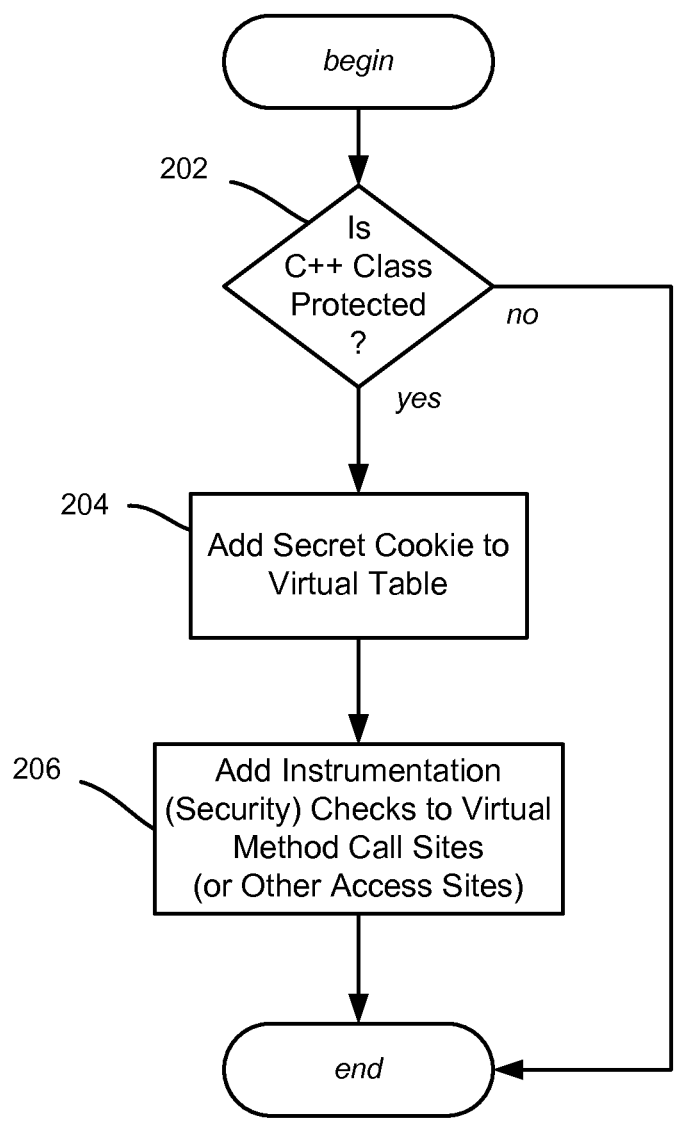
FIG. 2 is a flow diagram representing example steps for protecting a class corresponding to an object at compile time against object corruption vulnerabilities that may occur during runtime.

By way of example, FIG. 2 shows compiler steps with respect to protecting a virtual table when a class is associated with a flag, as detected by the compiler at step 202. Step 204 adds the secret cookie to the virtual table of the class, that is, the insertion of the secret cookie to the virtual function table associated with a C++ class is performed at compile time, e.g.:

```
virtual function table [0] = method
virtual function table [1] = cookie.
```

The secret cookie has a value that is designed to be unknown and undiscoverable to a malicious adversary, and therefore needs to be unpredictable at runtime. In one implementation, the secret cookie is set to the address of a function within a module that has been compiled with support for Address Space Layout Randomization (ASLR). When the module is loaded on a system that supports ASLR, the module will be relocated and the absolute address of the function will be updated at every location where it has been referenced (such as within the virtual function table of a protected C++ class). One benefit of this approach is that the overhead of updating the cookie on module relocation is automatically handled by an existing mechanism.

In an alternative implementation, a relocation type can be used to instruct the operating system to replace every reference to each secret cookie with a random value generated at runtime. For example, when the code is loaded, the operating system inserts a random-value secret cookie into the object's vtable, and into the secret cookie instrumentation check at the call sites for that object. One benefit of this approach is that it is not bound by the effectiveness of ASLR. Other ways to ensure the integrity of the object or its vtable, such as by comparing hash signatures, are also feasible. As used herein, "secret cookie" refers to any such data, including the address of a function, a random value, a hash value, and so forth.

Step 206 adds the security checks to the virtual method call sites. More particularly, the instrumentation checks inserted at each virtual method call site for a protected class are designed to verify, during runtime, that the integrity of the virtual function table is intact prior to allowing a virtual method call to occur. In typical use-after-free exploits, a malicious adversary will change the virtual function table pointer of a C++ class such that the virtual methods are made to point into code that the adversary wishes to execute. The addition of the secret cookie to the compiler-generated virtual function table for a protected class enables the compiler to insert instrumentation checks that verify the integrity of the virtual function table. Specifically, the compiler 104 can add a check that verifies that the virtual function entry corresponding to the secret cookie is set to the expected secret value, e.g.:

```
if virtual function table [1] ≠ cookie;
    abort ( );
object → method ( );
```

As can be seen in the above pseudocode, if this instrumentation check is not satisfied during runtime, the process or thread can be safely terminated and the intended virtual method will not be called. This prevents the malicious adversary from gaining control of execution flow. If the instrumentation check is satisfied, the virtual method call occurs as expected, because the cookie having the expected value is indicative of the integrity of the virtual function table being intact. Note that code that uses a protected class needs to be aware of the virtual table protections.

FIG. 1 also illustrates this aspect in the runtime 110. For instantiated protected objects 112, a secret cookie is inserted into the object's virtual function table as described above. Each of the virtual methods call sites have one or more instrumentation checks 114 inserted at its call site 116, whereby as described above, the call to a method can only proceed if the instrumentation check (or checks) are passed.

In addition to the secret cookie-based instrumentation check described above, the compiler 104 may also add additional instrumentation checks into the compiled code. For example, another check may be used to verify that the virtual function table pointer for a C++ class is within the bounds of the module (e.g., a .dll or .exe) that contains the implementation of the class when loaded and mapped in memory. Such a check prevents a malicious adversary from creating a fake virtual function table that exists outside of the bounds of the module.

As such, even if the malicious adversary is able to learn the value of the secret cookie, the adversary is not able to construct a fake virtual function table that will be accessed. Instead, the adversary needs to find a desirable fake virtual function table within the module that also satisfies the cookie check, which is less likely and thus adds to the overall protection scheme. Note that if the secret cookie is the address of a function in a module, it is not possible to protect C++ classes that may be instantiated and passed between module boundaries, as doing so would cause the cookie check and the virtual table bounds check to fail.

Figure 3:
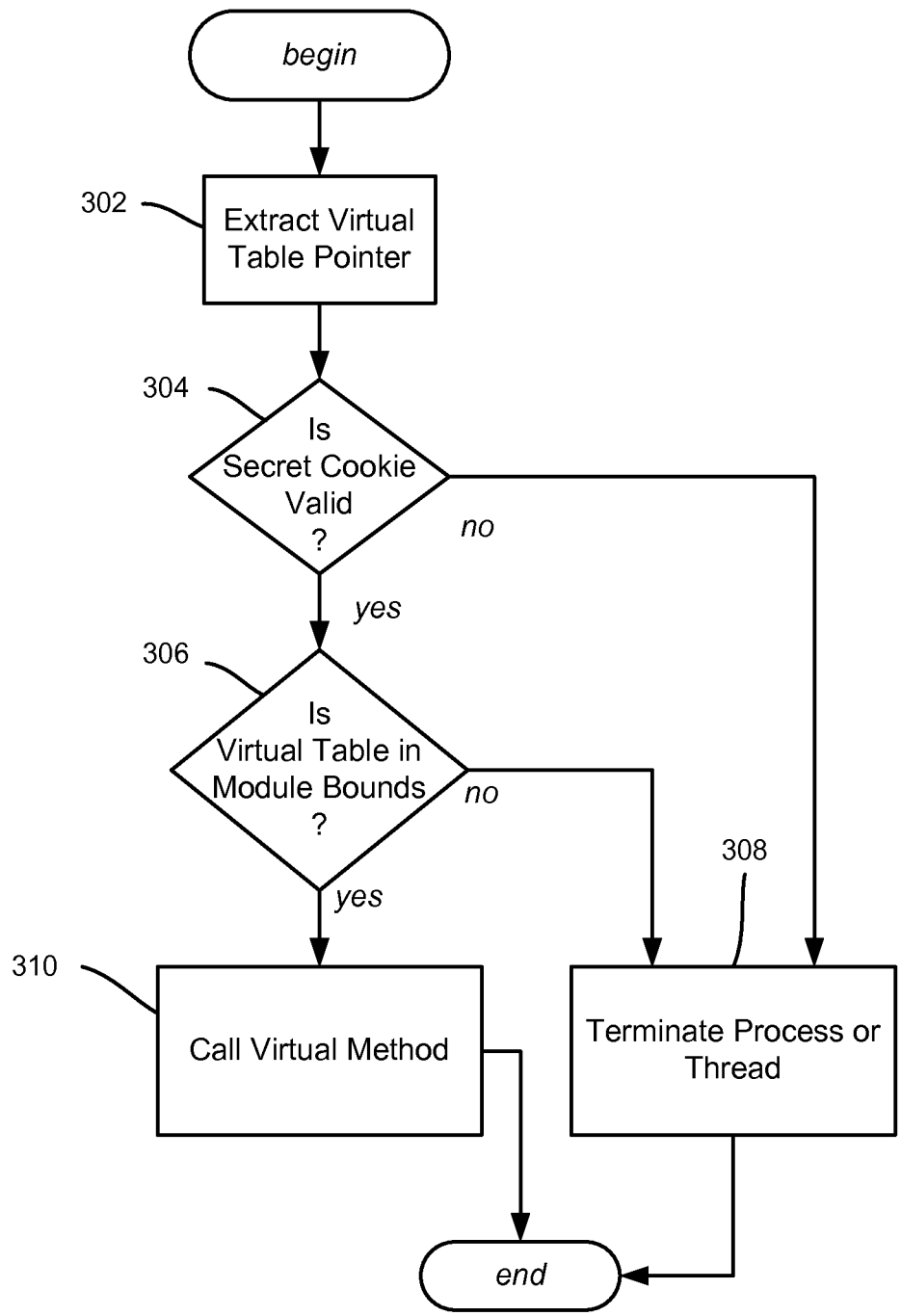
FIG. 3 is a flow diagram representing example steps for performing instrumentation checks at runtime to determine whether an object is corrupted, in order to allow or prevent access to the object's methods.

FIG. 3 represents example steps corresponding to the instrumentation checks at runtime. When an object's method is to be called, step 302 extracts the virtual table pointer which is used to locate the virtual function table. Instead of calling the method, the instrumentation check or checks are first performed. This may include the secret cookie check represented by step 304, e.g., comparing the object's current secret cookie value (containing whatever data is at that location) against the valid secret cookie value known to the instrumentation check. This also may include the virtual table bounds check represented by step 306. If any check fails, the process or thread is terminated (corresponding to the "abort" instruction in the above pseudocode). If each check is satisfied, the virtual method is called at step 310.

As can be readily appreciated, the instrumentation checks may be applied to any member field access (reads and writes) as well, such to prevent object corruption from having legitimate pointers in those fields replaced with pointers to malicious code. Indeed, any time it is desirable to verify the integrity of the object state, one or more instrumentation checks may be added to the code that accesses the object.

Turning to another aspect, as mentioned above, not all classes need to be protected. Various ways to determine which classes are to be protected against corruption vulnerabilities may include historical vulnerability data, static analysis, dynamic analysis, domain expertise, and so forth.

Moreover, once a base set of classes has been identified, an algorithm can be employed to expand the set of classes that is protected. One algorithm for doing this is directed towards identifying the recursive set of classes that are depended upon by the base set of classes (such as via member fields). This mitigates scenarios where a malicious adversary is able to cause a virtual method call to occur via a member field of a class that has been freed prematurely (as opposed to a virtual method call on the class itself).

In should be noted that the secret-based technology described herein has advantages over traditional CFI (Control Flow Integrity) solutions. For one, unlike CFI, there is no need to construct a Call Graph for the program; note that traditional CFI solutions need to construct a complete Call Graph in order to determine acceptable control flow transfers for the program that is being protected. Eliminating the need to construct a Call Graph reduces the compiler execution cost. Further, CFI technology does not enable CFI enforcement across module boundaries, as this would require a cross-module Call Graph (which modern compilers do not support). The use of secret data also provides advantages over CFI implementations, because some attackers are able to dynamically generate executable code that satisfies the CFI checks at a call site, e.g., CFI implementations "fail open" if they cannot determine the complete set of acceptable targets at a call site. In contrast, the secret-based approach described herein remains effective as long as the secret is not known by the attacker.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 4:
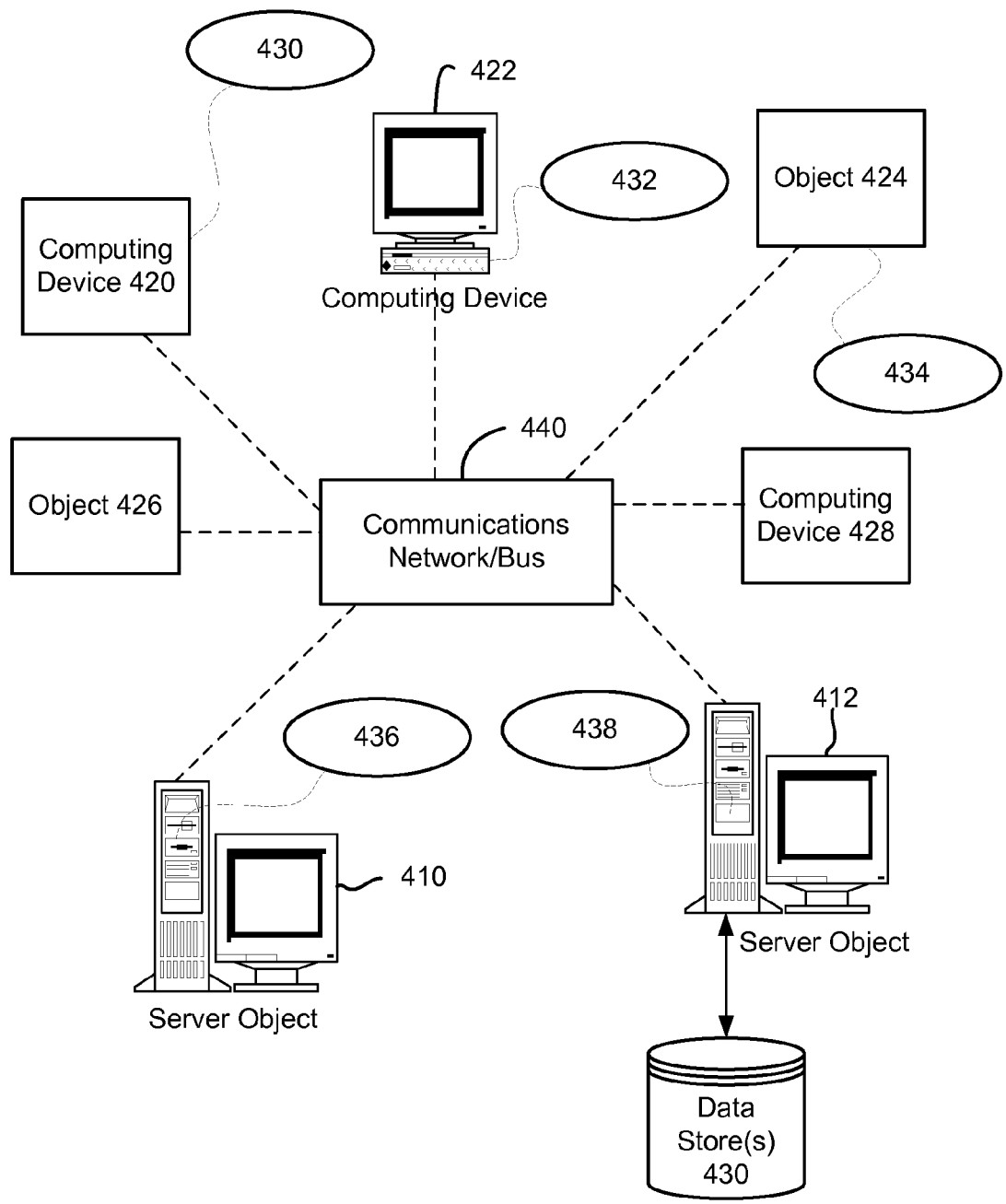
FIG. 4 is a block diagram representing exemplary non-limiting networked environments in which various embodiments described herein can be implemented.

FIG. 4 provides a schematic diagram of an exemplary networked or distributed computing environment. The distributed computing environment comprises computing objects 410, 412, etc., and computing objects or devices 420, 422, 424, 426, 428, etc., which may include programs, methods, data stores, programmable logic, etc. as represented by example applications 430, 432, 434, 436, 438. It can be appreciated that computing objects 410, 412, etc. and computing objects or devices 420, 422, 424, 426, 428, etc. may comprise different devices, such as personal digital assistants (PDAs), audio/video devices, mobile phones, MP3 players, personal computers, laptops, etc.

Each computing object 410, 412, etc. and computing objects or devices 420, 422, 424, 426, 428, etc. can communicate with one or more other computing objects 410, 412, etc. and computing objects or devices 420, 422, 424, 426, 428, etc. by way of the communications network 440, either directly or indirectly. Even though illustrated as a single element in FIG. 4, communications network 440 may comprise other computing objects and computing devices that provide services to the system of FIG. 4, and/or may represent multiple interconnected networks, which are not shown. Each computing object 410, 412, etc. or computing object or device 420, 422, 424, 426, 428, etc. can also contain an application, such as applications 430, 432, 434, 436, 438, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 4, as a non-limiting example, computing objects or devices 420, 422, 424, 426, 428, etc. can be thought of as clients and computing objects 410, 412, etc. can be thought of as servers where computing objects 410, 412, etc., acting as servers provide data services, such as receiving data from client computing objects or devices 420, 422, 424, 426, 428, etc., storing of data, processing of data, transmitting data to client computing objects or devices 420, 422, 424, 426, 428, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 440 or bus is the Internet, for example, the computing objects 410, 412, etc. can be Web servers with which other computing objects or devices 420, 422, 424, 426, 428, etc. communicate via any of a number of known protocols, such as the hypertext transfer protocol (HTTP). Computing objects 410, 412, etc. acting as servers may also serve as clients, e.g., computing objects or devices 420, 422, 424, 426, 428, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 5:
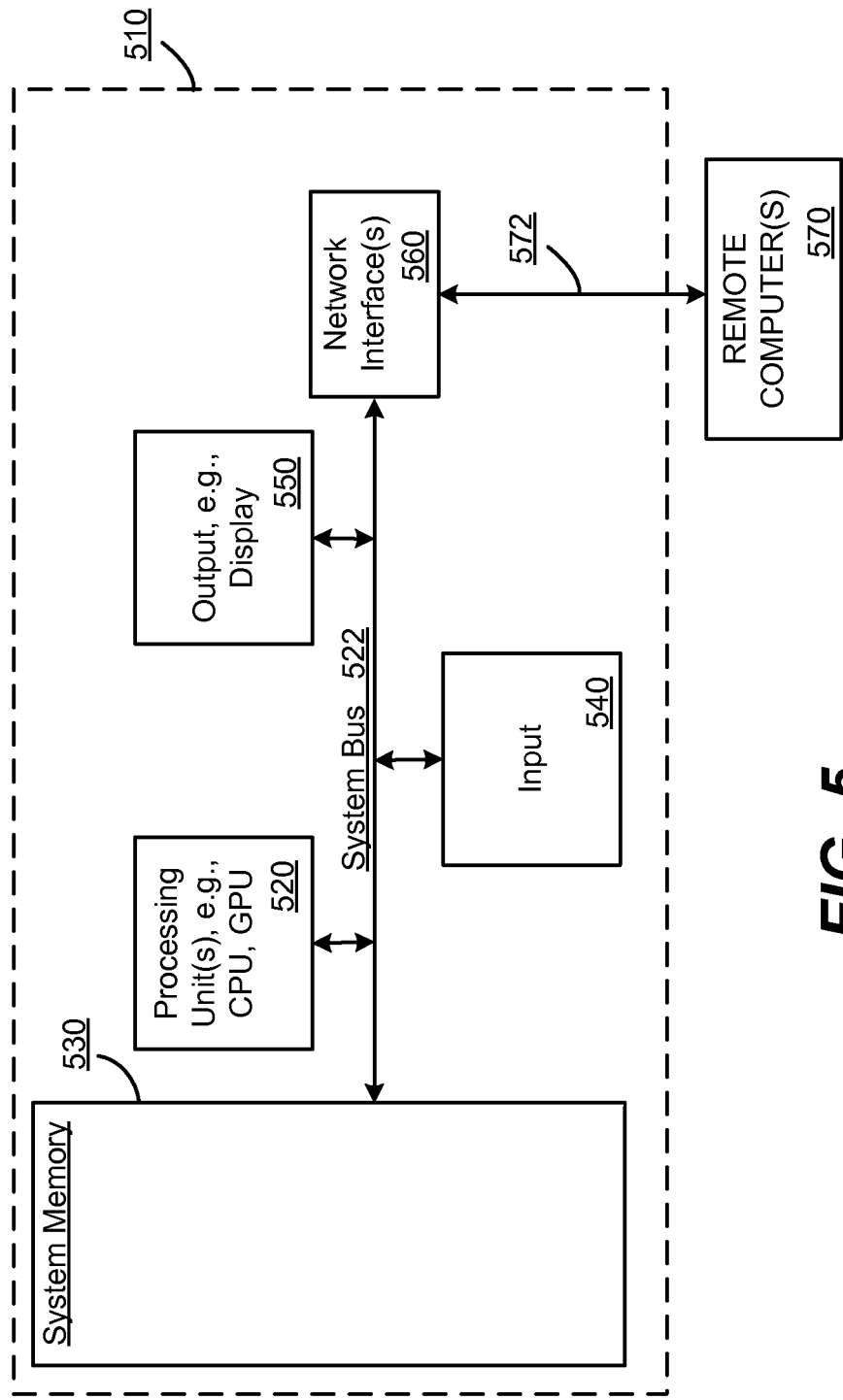
FIG. 5 is a block diagram representing an exemplary non-limiting computing system or operating environment in which one or more aspects of various embodiments described herein can be implemented.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the exemplary computing system environment 500.

With reference to FIG. 5, an exemplary remote device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of computer readable media and can be any available media that can be accessed by computer 510. The system memory 530 may include computer storage media in the form of volatile and/or nonvolatile memory such as read only memory (ROM) and/or random access memory (RAM). By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system comprising, at least one processor, a memory communicatively coupled to the at least one processor and including components comprising: an object configured with a secret cookie in a virtual function table of the object; and a program configured to attempt to access the object, the program including one or more instrumentation checks configured to determine whether the object state is corrupted, including an instrumentation check that evaluates a current value of the secret cookie in the virtual function table of the object against a valid value for the secret cookie known to the instrumentation check, the instrumentation check configured to allow access to the object only when each instrumentation check is satisfied.

2. The system of claim 1 wherein the instrumentation check is associated with an attempt to call a method of the object.

3. The system of claim 1 wherein the instrumentation check is associated with an attempt to access a member field of the object.

4. The system of claim 1 further comprising a compiler that detects a flag associated with a class corresponding to the object, the compiler configured to insert the secret cookie into the virtual function table, and into each instrumentation check that evaluates the current value of the secret cookie against the valid value when executed.

5. The system of claim 1 wherein the valid value of the secret cookie corresponds to an address of a function.

6. The system of claim 5 wherein the valid value of the secret cookie is automatically updated in the object and in each instrumentation check that evaluates the current value of the secret cookie, when a module containing the object is relocated.

7. The system of claim 1 wherein the valid value of the secret cookie is set to a random value in the virtual function table and in each instrumentation check that evaluates the current value of the secret cookie, when the object and program containing the instrumentation checks are loaded by an operating system.

8. The system of claim 1 wherein the program includes another instrumentation check configured to determine whether the virtual table is within bounds of a module that contains the object.

9. The system of claim 1 wherein the program is configured to terminate a process or thread that is attempting to access the object when an instrumentation check is not satisfied.

10. The system of claim 1 wherein the program includes the one or more instrumentation checks at each of a plurality of virtual method call sites that are each associated with an attempt to call a method of the object.

11. In a computing environment, a method performed at least in part on at least one processor, comprising: instantiating an object configured with a secret cookie in a virtual function table of the object; running a program that includes an instrumentation check for verifying the integrity of the object before allowing access to the object; executing the instrumentation check, including determining whether the object state has been corrupted by evaluating whether the secret cookie has an expected value known to the instrumentation check; and preventing access to the object when the secret cookie is not the expected value.

12. The method of claim 11 further comprising, during compilation, detecting a flag associated with a class corresponding to the object, and based on the flag, inserting the secret cookie into the virtual function table of the object and inserting the secret into the instrumentation check.

13. The method of claim 11 wherein executing the instrumentation check comprises determining whether the object state has been corrupted before allowing a call to a method of the object, and further comprising, allowing the call if the instrumentation check determines that the secret cookie has an expected value and if any other instrumentation check is also satisfied, or terminating a process or thread if the instrumentation check determines that the secret cookie does not have an expected value or if any other instrumentation check is not satisfied.

14. The method of claim 11 wherein executing the instrumentation check comprises determining whether the object state has been corrupted before allowing access to a member field of the object, and further comprising, allowing the access if the instrumentation check determines that the secret cookie has an expected value and if any other instrumentation check is also satisfied, or terminating a process or thread if the instrumentation check determines that the secret cookie does not have an expected value or if any other instrumentation check is not satisfied.

15. The method of claim 11 wherein the secret cookie corresponds to an address of a function, and further comprising, updating the secret cookie when a module containing the object is relocated by a system that supports Address Space Layout Randomization.

16. The method of claim 11 wherein the secret cookie corresponds to a random value, and further comprising, writing the random value into the secret cookie in the virtual function table and in the instrumentation check when loading the object and program.

17. The method of claim 11 further comprising, executing another instrumentation check, including determining whether the virtual table is within bounds of a module that contains the object, and preventing access to the object when the virtual table is not within the bounds.

18. One or more computer-readable memory having computer-executable instructions, which when executed perform steps, comprising, executing program code, including determining whether to allow a virtual method call to an object by performing one or more instrumentation checks in the program code to evaluate at least one secret cookie value and verify whether a virtual table's integrity is intact based upon validity of the at least one secret cookie value.

19. The one or more computer-readable memory of claim 18 wherein performing the one or more instrumentation checks comprises determining whether a current value of a secret cookie in a virtual function table of the object matches a valid value that is known to the program code for that secret cookie.

20. The one or more computer-readable memory of claim 18 wherein performing the one or more instrumentation checks comprises determining whether a virtual function table of the object is within bounds of a module that contains the object.

* * * * *